United States Patent
Krowas et al.

(10) Patent No.: US 8,429,054 B2
(45) Date of Patent: *Apr. 23, 2013

(54) MANAGING SECURITY HOLDINGS RISK DURING PORTFOLIO TRADING

(75) Inventors: John Krowas, Boston, MA (US); Ian Domowitz, New York, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,708

(22) Filed: Oct. 3, 2011

(65) Prior Publication Data

US 2012/0203709 A1    Aug. 9, 2012

Related U.S. Application Data

(63) Continuation of application No. 11/808,261, filed on Jun. 7, 2007, now Pat. No. 8,032,441, which is a continuation-in-part of application No. 10/376,599, filed on Mar. 3, 2003, now Pat. No. 7,904,365.

(51) Int. Cl.
*G06Q 40/00*    (2012.01)

(52) U.S. Cl.
USPC .......................................... 705/36 R; 705/35

(58) Field of Classification Search .............. 705/35–45
See application file for complete search history.

(56) References Cited

U.S. PATENT DOCUMENTS

| | | | |
|---|---|---|---|
| 5,799,287 A | 8/1998 | Dembo | |
| 6,003,018 A | 12/1999 | Michaud et al. | |
| 6,311,169 B2 | 10/2001 | Duhon | |
| 6,493,682 B1 | 12/2002 | Horrigan et al. | |
| 6,829,590 B1 | 12/2004 | Greener et al. | |
| 2002/0002521 A1 | 1/2002 | Shearer et al. | |
| 2002/0023043 A1 | 2/2002 | Samukawa | |
| 2002/0046145 A1 | 4/2002 | Ittai | |
| 2002/0082967 A1 | 6/2002 | Kaminsky | |
| 2002/0091605 A1 | 7/2002 | Labe, Jr. et al. | |
| 2002/0103742 A1 | 8/2002 | Billings et al. | |

(Continued)

FOREIGN PATENT DOCUMENTS

| | | |
|---|---|---|
| EP | 0790568 A1 | 8/1997 |
| EP | 0985188 B1 | 3/2000 |
| WO | 0241120 A2 | 5/2002 |
| WO | 02079923 A2 | 10/2002 |

OTHER PUBLICATIONS

International Search Report and Written Opinion issued in PCT/US2008/006868 dated Aug. 15, 2008, 5 pages.
"A simplified Model for Portfolio Analysis", William F. Sharpe, Management Science, vol. 9, No. 2 (Jan. 1963) pp. 277-293.

*Primary Examiner* — Richard C Weisberger
(74) *Attorney, Agent, or Firm* — Rothwell, Figg, Ernst & Manbeck, P.C.

(57) ABSTRACT

The present invention provides methods and systems for managing short-term risk to a portfolio of securities holdings while executing an outstanding trade list. The methods and systems may include steps of determining covariances between securities in the outstanding trade list and securities in the portfolio of holdings; receiving a risk variable, at least one constraint on the execution of a trade, and a proposed quantity representing a portion of said outstanding trade list desired to be executed at a particular time; and determining an immediately executable trade list based at least in part on the covariances and risk variable. The executable trade list must satisfy all of the trade constraints and also must be substantially equal to or less then the proposed quantity.

12 Claims, 4 Drawing Sheets

U.S. PATENT DOCUMENTS

| | | |
|---|---|---|
| 2002/0120524 A1 | 8/2002 | Smith |
| 2002/0138371 A1 | 9/2002 | Lawrence et al. |
| 2002/0138401 A1 | 9/2002 | Allen et al. |
| 2002/0138407 A1 | 9/2002 | Lawrence et al. |
| 2002/0138408 A1 | 9/2002 | Lawrence |
| 2002/0138417 A1 | 9/2002 | Lawrence |
| 2002/0147671 A1 | 10/2002 | Sloan et al. |
| 2002/0174042 A1 | 11/2002 | Arena et al. |
| 2002/0174047 A1 | 11/2002 | Fernholz |
| 2002/0178046 A1 | 11/2002 | Lawrence |
| 2003/0014347 A1 | 1/2003 | Tiefenbrun |
| 2003/0014356 A1 | 1/2003 | Browne et al. |
| 2003/0023543 A1 | 1/2003 | Gunewardena et al. |
| 2003/0028462 A1 | 2/2003 | Fuhrman et al. |
| 2003/0105702 A1 | 6/2003 | Long, III et al. |
| 2003/0177077 A1 | 9/2003 | Norman |
| 2003/0182224 A1 | 9/2003 | Horrigan et al. |
| 2003/0208427 A1 | 11/2003 | Peters et al. |
| 2003/0233306 A1 | 12/2003 | Madhavan et al. |
| 2004/0039675 A1 | 2/2004 | Wallman |
| 2004/0064393 A1 | 4/2004 | Luenberger |
| 2004/0078319 A1 | 4/2004 | Madhavan et al. |
| 2004/0128222 A1 | 7/2004 | Turbeville et al. |
| 2004/0167843 A1 | 8/2004 | French |
| 2004/0177023 A1 | 9/2004 | Krowas et al. |
| 2004/0181479 A1 | 9/2004 | Zosin et al. |
| 2004/0186804 A1 | 9/2004 | Chakraborty et al. |
| 2004/0199447 A1 | 10/2004 | Treynor |
| 2004/0199452 A1 | 10/2004 | Johnston et al. |
| 2004/0205018 A1 | 10/2004 | Degraaf et al. |
| 2005/0004857 A1 | 1/2005 | Schwarz |
| 2006/0190383 A1 | 8/2006 | May |

MANAGING SECURITY HOLDINGS RISK DURING PORTFOLIO TRADING

REFERENCE TO RELATED APPLICATION

This application is a Continuation of and claims priority to U.S. patent application Ser. No. 11/808,261 filed Jun. 7, 2007, which is a Continuation-In-Part of U.S. patent application Ser. No. 10/376,599 filed Mar. 3, 2003, now U.S. Pat. No. 7,904,365, issued Mar. 8, 2011, the contents of each of which are incorporated herein in their entirety.

BACKGROUND OF THE INVENTION

1. Field of the Invention

This invention relates generally to trading strategies in securities markets. Particularly, this invention relates to a method and system for automatically determining an immediately executable trade list, or "wedge," which both satisfies user constraints, and advances the objectives of the traders, such as minimizing the overall risk to a portfolio of financial security holdings.

2. Background of the Related Art

Various automated trading systems are known, which execute so-called "program" trading strategies in response to market movements.

Generally, portfolio managers for large institutional investors, such as mutual funds, hedge funds, etc., are responsible for trading large blocks of financial securities. These portfolio managers typically prefer not to send large market orders, which may have adverse market implications creating inferior execution prices. However, a portfolio manager's desire to avoid negative trade implications must be balanced with the time frame within which the portfolio manager's trades must be completed. In order to best satisfy the competing criteria, portfolio managers, generally, divide large trade blocks of financial securities into multiple smaller portions which are sent over the given time frame according to a predefined trading strategy. Generally, such a predefined trading strategy would minimize risk to the unexecuted portion of the larger trade block by minimizing unfavorable market movements caused by the execution of the smaller orders.

An example of a known trading strategy is the treatment of an unexecuted trade list as a long-short portfolio and utilizes a multi-factor risk model to construct a minimal risk "portfolio" of unfilled orders to be sent simultaneously for execution. The minimal risk "portfolio" when executed minimizes the risk to short-term return of the unexecuted trade list.

The Markowitz Model (as described in "Portfolio Selection," Dr. H. M. Markowitz, *Journal of Finance*, Mar. 7, 1952), is a well-known optimization strategy that balances the expected return and risk of a portfolio to allow the construction of one such minimal risk "portfolio." The decision variables used in the model are the amounts invested in each asset. According to this model, the statistical variance of a stock's price is used as a measure of its risk, the expected return of the stock is used as a measure of its utility or long-term prospects, and the variance of a portfolio's return is derived from the covariances for the returns of the individual assets in the portfolio.

Variance is a measure of fluctuation in the rate of return of an asset, such as a financial security. Generally, higher variance levels indicate higher risk investments. Covariance is a measure of the correlation between return fluctuations of multiple assets. A high covariance between two assets indicates that an increase or decrease in one asset's return is likely to correspond to a parallel increase or decrease in the second asset's return. Conversely, a negative covariance indicates that an increase or decrease in one asset's return is likely to correspond to an opposite increase or decrease in the second asset's return. Moreover, a low covariance indicates that the return rates of the two assets are relatively independent, meaning an increase or decrease in one asset's return will have little or no effect on the return of another asset. Thus, the risk of a portfolio is best determined not by a simple weighted average of the risks of individual assets in the portfolio, but instead by assessing the relationships between the returns of the various individual assets in a portfolio.

A shortcoming of the known trading risk objective model is that it fails to account for short-term effects that each trade has on the overall portfolio of holdings, which includes securities not to be traded and unexecuted securities to be traded. Further, this shortcoming is exacerbated when portfolio managers must adhere to certain constraints in their trades, thus limiting the viable options for any given trade.

Thus, there exists a need for improvements in the art which allows for proper selection of the best trade option from all viable trade options which a portfolio manager has available. This selection should be based on both the objectives of and constraints on the individual trades.

SUMMARY OF THE INVENTION

According to embodiments of the present invention, methods and systems are provided for managing short-term risk to a portfolio of securities holdings while executing an outstanding trade list.

In one embodiment, the present invention includes the steps of: determining covariances between securities in the outstanding trade list and securities in the portfolio of holdings; receiving at least one objective to be achieved by the trade; receiving at least one constraint for the execution of a trade; receiving a percentage of value of the outstanding trade list desired to be executed in the current wave of trading; and determining an immediately executable trade list based at least in part on the covariances, the at least one objective, and the at lease one constraint, the executable trade list satisfying the at least one constraint, and the proposed quantity.

In another embodiment, the present invention includes: means for determining covariances between securities in the outstanding trade list and securities in the portfolio of holdings; means for receiving at least one objective to be achieved by the trade; means for receiving at least one constraint for the execution of a trade; means for receiving a percentage of value of the outstanding trade list desired to be executed in the current wave of trading; and means for determining an immediately executable trade list based at least in part on the covariances, the at least one objective, and the at lease one constraint, the executable trade list satisfying the at least one constraint, and the proposed quantity.

The present invention will become more fully understood from the forthcoming detailed description of the preferred embodiments when read in conjunction with the accompanying drawings. Both the detailed description and the drawings contain various embodiments of the present invention, and are given by way of illustration only. The present invention, as claimed, is not limited to any particular embodiments set forth in the detailed description and the drawings.

DETAILED DESCRIPTION OF THE PREFERRED EMBODIMENTS

Figure 1:
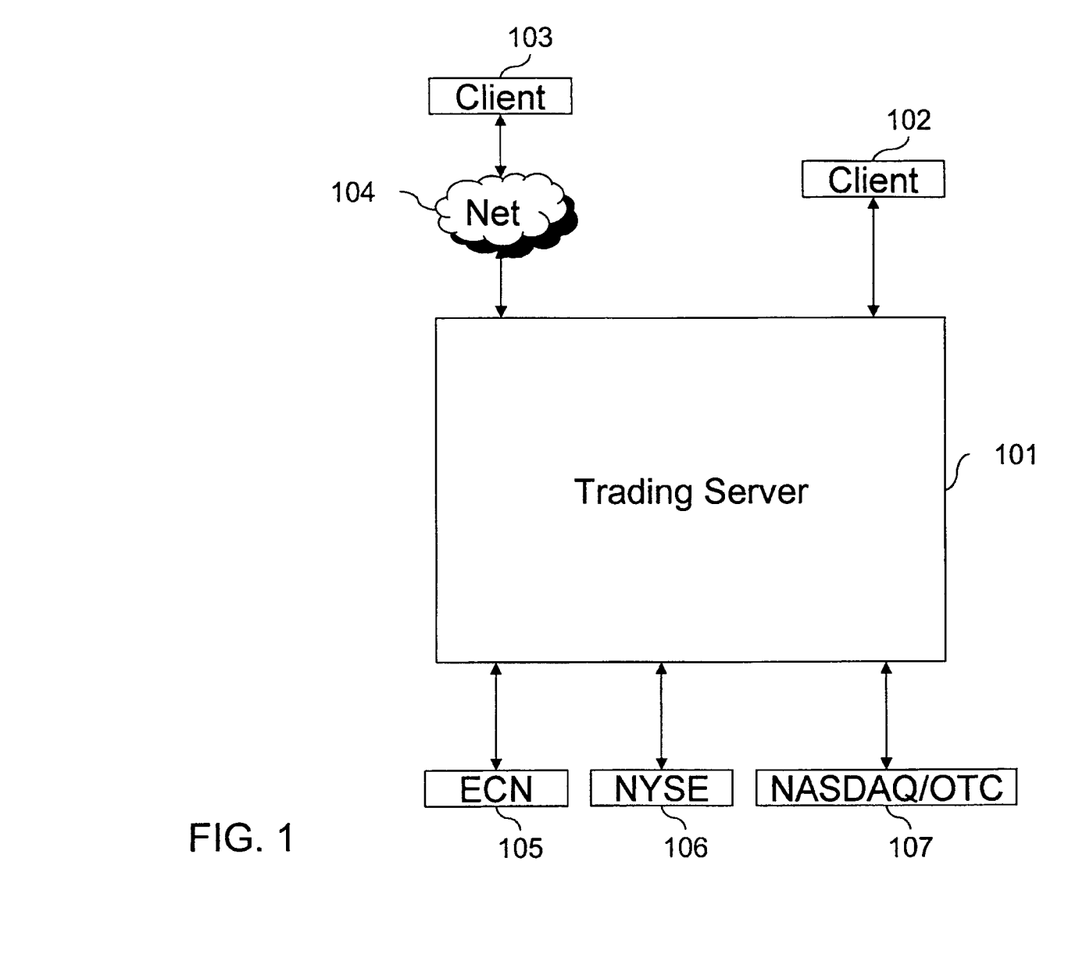
FIG. 1 is a flow diagram of a process for determining a minimal risk residual trade list in an environment without constraints.

As shown in FIG. 1, a trading risk model can be implemented by a System that can include a server 101, which is in communication with various exchanges, such as an Electronic Communication Network (ECN) 105, the New York Stock Exchange 106, the NASDAQ/OTC market 107, and other like markets/exchanges. A client 102 may be composed of a PC, workstation or similar device, and may be directed coupled to the server 101; other clients, such as client 103, can be coupled to the server 101 through a distributed communication network 104, which may be the Internet, a Wide Area Network (WAN), a Local Area Network (LAN), or any other similar type of communication network.

Figure 2:
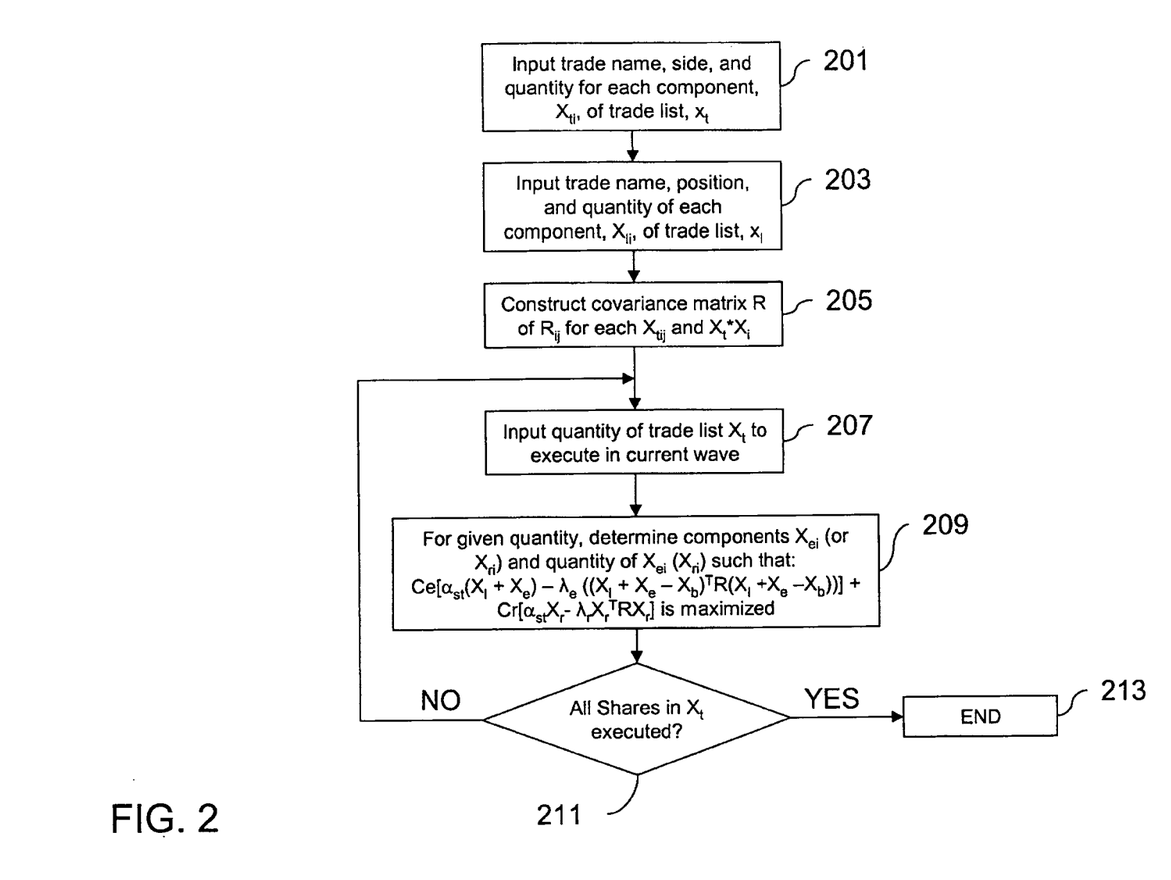
FIG. 2 is a block diagram of a system for implementing the process shown in FIG. 3.

FIG. 2 illustrates a flow diagram of a method according to an embodiment of the present invention. At step 201a trader or other user inputs to the server 101 the trade name (e.g., stock name or symbol), trading side (i.e., buy or sell) and quantity (e.g., dollar amount or number of shares) for each component $X_{ti}$ of a desired trade list $X_t$. Here, BUYS may be denoted by a positive (+) sign and SELLS may be denoted by a negative (−) sign. At step 203, the trader or user inputs the trade name, side (i.e., long or short) and quantity of each component $X_{li}$ of a portfolio of initial holdings $X_l$. Again, long positions may be denoted by a positive (+) sign and short positions may be denoted by a negative (−) sign.

At step 205, a covariance matrix R may be constructed containing the covariance $R_{ij}$ for the components $X_{tj}$ in the trade list, and the covariance $R_{ij}$ for the components in $X_t$ against the components in $X_l$. The covariance $R_{ij}$ between any two trade names can be determined from historical trading data.

Next, at step 207, the quantity of shares (in terms of dollar amount, share amount, or percentage value of the total trade list) desired to be traded in a current wave are inputted. This number may be determined in accordance with a specific trading strategy used by the trader (i.e., automated trade strategy or manually implemented) taking into account various market data parameters. Such trading strategies are generally well known in the art and thus will not be further discussed herein.

Once the quantity of shares to be executed in a current wave is inputted, at step 209 the components $X_{ei}$ of an execution trade list $X_e$ are determined that will minimize the risk to the resulting residual trade list $X_r$ as well as the static portion of the overall portfolio, which consists of the initial holdings $X_l$, plus any holdings $X_e$ acquired in previous waves. Since the expected return terms are linear and $X_t$ is fixed, it is equivalent to determine the components $X_{ri}$ of the residual trade list $X_r$.

The risk associated with the residual portfolio holdings may be represented by the matrix term $$X_r^T R X_r,$$

wherein all of the covariances among the residual securities are summed. Similarly, the risk associated with the residual-plus-static portfolio holdings may be represented by the matrix term $$(X_l + X_e - X_b)^T R (X_l + X_e - X_b),$$

wherein $X_b$ is a benchmark term (which may be zero).

Here, the notion of short term return $a_{st}$ for each of the components of the residual trade list and the static holdings is defined as the expected return over the time during which the trade list $X_t$ is implemented. For the purposes of the present invention, the notion of short-term return is separated from any long-term return prediction that resulted in the choice of the trade list $X_t$ in the first instance. Similarly, the notion of short-term risk $A_{st}$ for each of the components is defined as an expected risk over the time that the trade list is implemented.

An objective function may now be constructed of the form $$c_e[\alpha_{st}(X_l+X_e)-\lambda_{st}((X_l X_e-X_b)^T R(X_l+X_e-X_b))]+c_r \cdot [\alpha_{st}X_r-\lambda_{st}X_t^T R X_r],$$

which takes into account the short-term interests of both the trader and the portfolio manager. The constants $c_e$ and $c_r$ may be used to bias the solution towards the overall holdings or the residual trade list. The objective function is solved for its maximum value so as to determine a minimal risk residual trade list $X_r$ (and thus an execution portion $X_e$) which also takes into account the short-term risk to the portfolio holdings.

At step 211, it can be determined whether the entire trade list $X_t$ has been completed. If so, the process ends at step 213; if not, the process returns to step 207 to input the quantity desired for the next trading wave.

As indicated in the above equations, the short-term risks and returns are evaluated by including terms in the equations corresponding to each of the risks/returns to be considered when creating the minimal risk residual trade list or immediately executable trade list.

Figure 3:
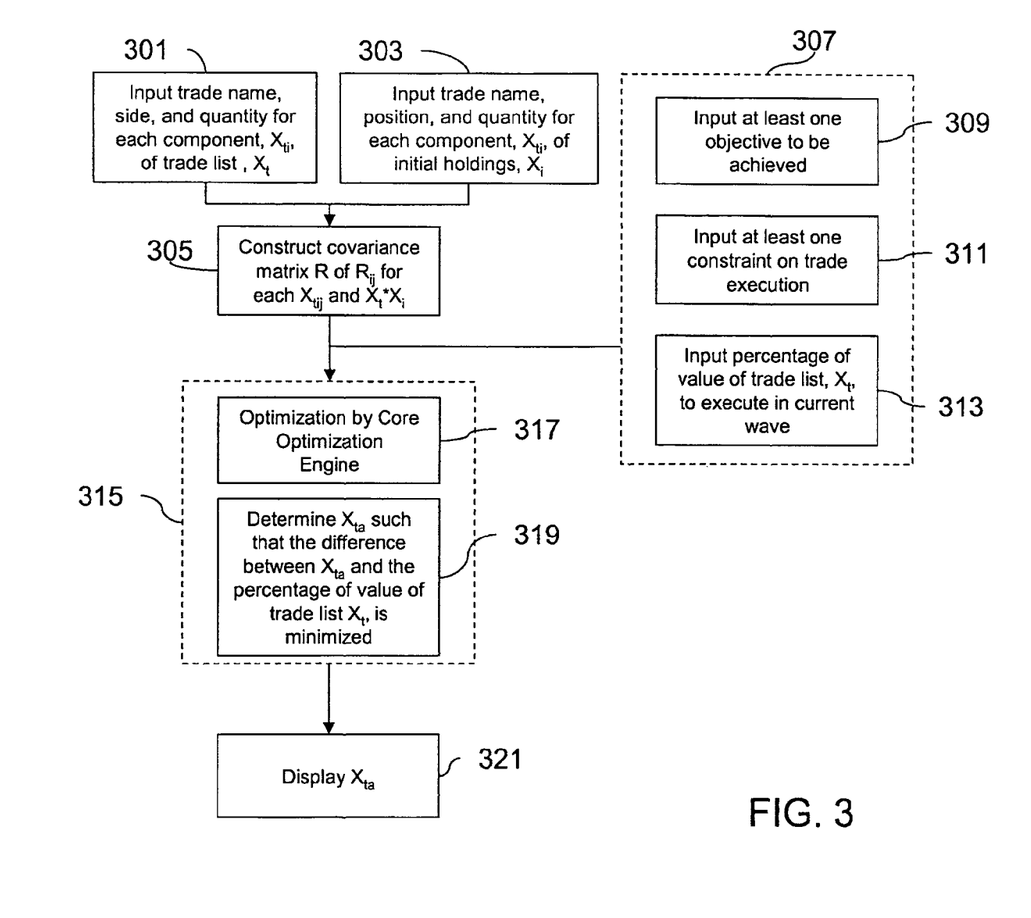
FIG. 3 is a flow diagram of a process for determining a minimal risk immediately executable trade list in an environment which includes at least one constraint.

FIG. 3 illustrates a flow diagram of a method according to another embodiment of the present invention. In this method, steps 301, 303, and 305 the steps are identical to steps 201, 203, and 205 of FIG. 2.

At step 309, the portfolio manager or other user inputs at least one objective to be achieved by a current trade. The minimization of risk is one example of a possible objective for a trade. At step 311, the portfolio manager or other user inputs at least one constraint on the trade execution. The use of "All-or-Nothing" trades (further defined below) where all or none of any one stock may be traded, is an example of one possible constraint on a trade.

At step 313, the portfolio manager or other user inputs the percentage of the trade list's value to execute during the current wave of trading. For example, if a trader wants to execute 25% of the value of a trade list worth $100,000, the optimized immediately executable trade list optimally would be worth $25,000. Collectively, steps 309, 311, and 313 make up the user inputs for each round of optimization, step 307.

At step 317, the Core Optimization Engine finds the optimal immediately executable trade list or wedge. This Core Optimization Engine uses technology well known in the art, such as mixed integer programming, to solve complex proprietary equations. If the immediately executable trade list does not equal the value input of step 313 and the user has enabled the feature of variable progress, an additional step is taken at 319 which adjusts the optimal immediately executable trade list to a value which is less than or equal to the value input of step 313. This "Variable Progress" adjustment is still governed by the input of steps 309 and 311. Collectively, steps 317 and 319 are the optimization engine, 315.

At step 321, an optimal immediately executable trade list or wedge which satisfies the user inputs of 309, 311, and 313 is displayed to the user. At this point, the user may then act on the suggestion and trade the securities in the current wave.

If after executing a wave of trades, the trade list, $X_t$, has not been completely executed, the user may again use the method shown in FIG. 3, as described above, to determine the next wave of trades. However, each optimization iteration can be separate and distinct, and may be governed by objectives and constraints which are the same and/or different. Further, it may be required that a trader use the method more than once. For example, a trader might use the current invention to solve for a particularly difficult trading problem, and once that problem has been solved turn to a different system to establish the next wave of trading.

Figure 4A:
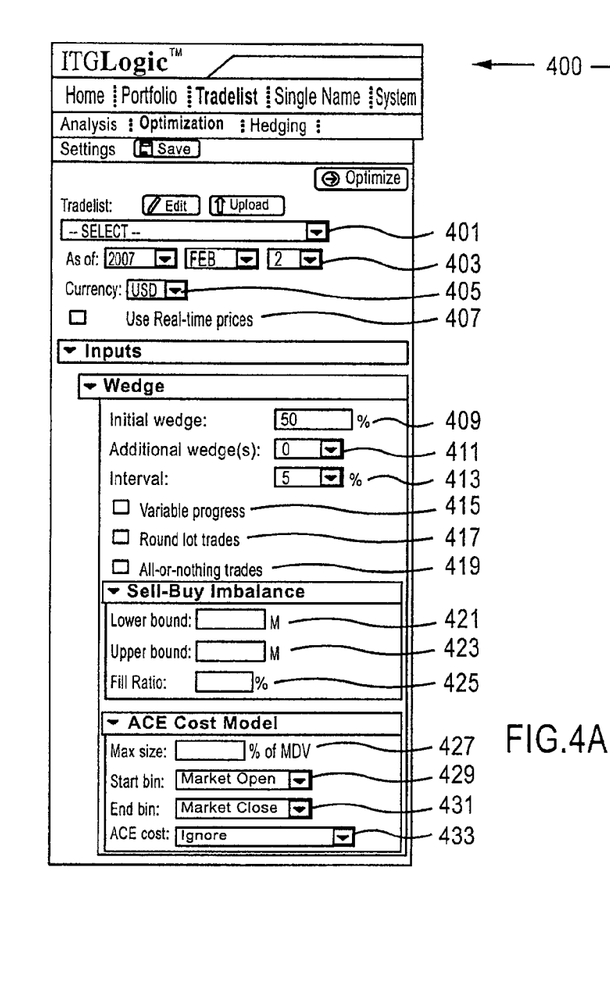
FIG. 4A is a screen shot of a user interface according to an embodiment of the current invention.
Figure 4B:
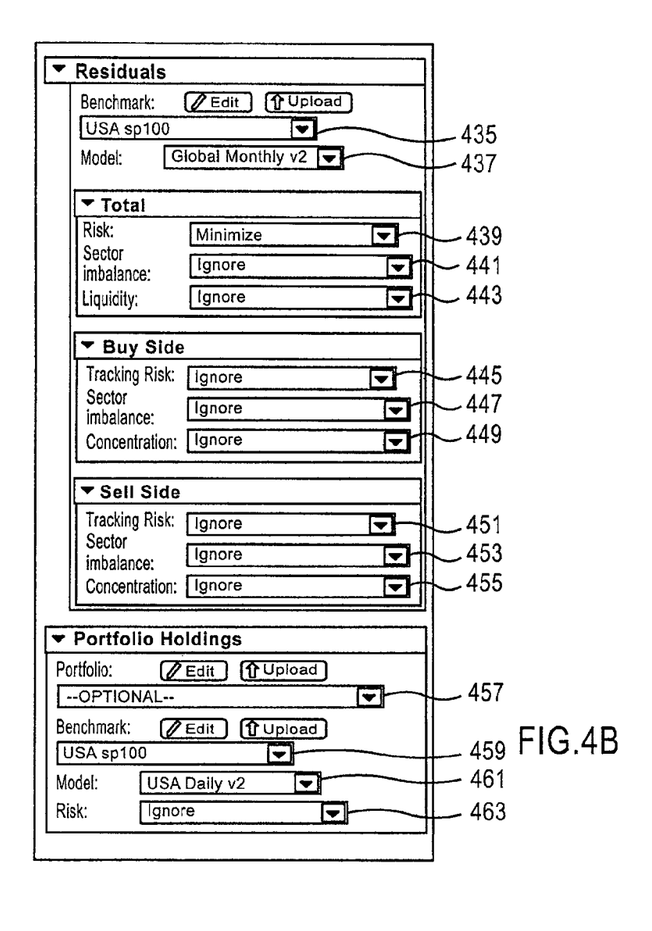
FIG. 4B is a screen shot of a user interface according to an embodiment of the current invention.

FIGS. 4A and 4B are two screen shots of a user interface according to an embodiment of the present invention. User interface 400 can be configured to allow entry of variables, objectives, and constraints which are used by the system in managing short-term risk to a portfolio of securities by generating immediately executable trade lists or wedges through the method described above and shown in FIG. 3. The user interface may be used with the invention as described in any of the embodiments above.

At field 401, a user can select a tradelist to be optimized. Tradelists can include a mix of BUY trades, SELL trades and stocks from multiple countries.

At field 403, a user can select a date on which to run the optimization. This is called the "as of" field. Most usage is for live trading, so the current date is selected. However, historical data is available for testing and evaluation of the system.

At field 405, a user can select the currency in which to display prices, trade values and other currency-based quantities.

At field 407, a user can select the use of real-time prices. When optimizing a tradelist during trading hours, real-time prices may be used to value the trade amounts. By default, closing prices from the "as of" date are used.

Fields 409, 411, 413, 415, 417, 419, 421, 423, 425, 427, 429, 431, and 433, all are inputs relating to the immediately executable trade list or wedge.

At field 409, a user can input an objective "Initial Wedge Size." The "Initial Wedge Size" means the desired amount of trading progress to be made by the immediately executable trade list expressed as a percentage of tradelist value. For example, if a tradelist has a total value of $100 and this parameter is set to 20%, then the wedge will have a value of $20 and the residual tradelist $80. This field is called the initial wedge.

At fields 411 and 413, a user can provide for additional immediately executable trade lists or wedge(s) to be displayed at a given interval. Up to four additional wedges may be generated to compare the properties of wedge and residual lists at multiple progress amounts. Continuing the previous wedge example, if two additional wedges at ten percent progress are specified, then wedges at 20% (initial), 30% and 40% would be created. This feature allows a trader to easily explore different trading options and strategies.

At field 415, a user can select as an option "Variable Progress." "Variable Progress" allows the immediately executable trade list is allowed to be equal to or less than the received percentage of value while at least one constraint is satisfied. In certain cases, constraints on a trade wave may make reaching the specified progress, i.e., the value desired to be traded in the immediately executable trade list, infeasible. Setting Variable Progress to TRUE makes progress a soft constraint, allowing the other constraints to be honored; the progress in an output wedge may then be less than or equal to the specified input.

At field 417, a user can select as an option "Round Lot Trades." "Round Lot Trades" is a constraint that limits trade amounts in the immediately executable trade list to be in round lot amounts. Optimization operates on continuous variables, which means an immediately executable trade list may contain fractional or share amounts rounded to the nearest share (e.g., 347 shares). Trading is typically done in round lot sizes (usually 100 shares in the United States). Setting this parameter to TRUE will force the trade amounts in a wedge to be in round lot amounts.

At field 419, a user can select as an option "All-or-Nothing Trades." "All-or-Nothing Trades" is a constraint that limits the immediately executable trade list to include either all or none of the shares of a stock included on the outstanding trade list. The optimization may suggest trading in a wedge any portion of a stock's original tradelist quantity. For example, if a tradelist includes 700 shares of a stock, then a wedge can have any amount of shares between and including 0 and 700 shares of the stock; 0, 250, 400 and 700 would all be potential share amounts in a wedge. Setting this parameter to TRUE will force the wedge to include either all (700) or none (0) of the stock's shares.

At fields 421 and 423, a user can input a "SELL-BUY Imbalance." "SELL-BUY Imbalance" is a constraint that limits the immediately executable trade list to contain more BUYS than SELLS, more SELLS than BUYS, or and equal number of BUYS and SELLS. This parameter bounds the amount by which the aggregate buy trade value differs from the aggregate sell trade value in an optimized wedge. The bounds can be used to force more BUYS than SELLS, more SELLS than BUYS or equal amounts of each to be in a wedge.

At field 425, a user can input a "Fill Ratio." "Fill Ratio" is a constraint that limits the immediately executable trade list to maintain a defined ratio of value between BUYS and SELLS. This parameter is an alternate way to specify the BUY-SELL imbalance of a wedge. Many times a tradelist starts with an imbalance between its BUY and SELL aggregate values, which can be expressed as a ratio of the two values. The Fill Ratio parameter allows that initial imbalance to be maintained during each optimization by bounding the BUY-SELL imbalance of a wedge at the appropriate amount. For example, if a tradelist has $60 in BUY trades and $40 in SELL trades, then the imbalance is 60:40 or 150%. The wedge could be constrained to fill $1.5 in BUY trades to each $1 in SELL trades by setting the fill ratio to 150%.

Using fields 427, 429, 431, and 433, a user can estimate the cost to trade a wedge.

At field 427, a user can input a "Max Size in Percent of Median Daily Trading Volume." "Maximum Size in Percent of MDV" is a constraint that limits the immediately executable trade list to be equal to or less than the specified percentage of the 21 day MDV trading volume in the stock. This constraint prevents the optimizer from suggesting trades that would be too large (and costly) to execute during the trading of the wedge.

At fields 429 and 431, a user can enter "Start and End Bins." "Start and End Bins" is a constraint that limits the ACE cost calculations to be based on user defined start and end times. The ACE cost model calculates trading costs based on the shares traded in one or more 30 minute segments during the day. To estimate the cost of trading the shares in a wedge, a user can set the start and end times for the wedge using these inputs.

At field 433, a user can provide for "ACE cost" consideration when running optimization. "ACE Cost" is a constraint that limits the cost of trading the immediately executable trade list. The choices for this field may include Ignore, Bound, Minimize, and Minimize & Bound. According to the selection, the ACE estimated cost of trading a wedge between the selected "Start and End Bins" is bounded at a maximum value, minimized or both bounded and minimized, respectively. For example, a user can bound the expected cost of a wedge to be less than or equal to 0.5%.

Fields 435, 437, 439, 441, 443, 445, 447, 449, 451, 453, and 455, all are objectives relating to residuals. These settings control the objective functions that apply to the residual tradelist. They may be applied to:

Total residual tradelist—the entire remaining set of trades including both buy and sell trades, treated as a long-short portfolio with positive and negative positions.

Buy side residuals—the set of remaining buy trades only, treated as a long-only portfolio.

Sell side residuals—the set of remaining sell trades only, treated as a long-only portfolio.

At field 435, a user can set a benchmark to be used in assessing the Total, BUY, and SELL Side residuals. The risk of the Total residuals, the tracking risk of the BUY Side residuals, and the tracking risk of the SELL Side residuals can be controlled relative to a benchmark. The benchmark may be a standard market index or any portfolio of stocks uploaded by a user. The "Tracking Risk" and "Sector Imbalance" settings in the "BUY Side" and "SELL Side" Residual tradelist are used in conjunction with the benchmark set here.

At field 437, a user can set a risk model. A risk model is provided to compute the risk of the Total residuals, the tracking risk of the BUY Side residuals, and/or the tracking risk of the SELL Side residuals. As an example, the entire suite of ITG equity risk models could be provided. The risk models currently offered by ITG include: USA daily, weekly, monthly; Global Monthly; North America daily; CAN, GBR and AUS daily.

At fields 439, 445, and 451, a user can employ objectives that apply to "Total Risk", BUY Side Tracking Risk", and/or "SELL Side Tracking Risk." These parameters are used to activate the minimization and/or bounding of the total volatility of the residual tradelists. Choices are, for example: Ignore, Minimize, Upper Bound, and Minimize & Bound. Selecting Minimize attempts to find the lowest risk residual tradelist that can be found while still meeting all other bounds specified by the user. Setting a Bound creates a hard bound that will be met, if possible, while meeting all other bounds and objectives, such as minimizing wedge cost.

At fields 441, 447, and 453, a user can employ objectives that apply to "Sector Imbalance". "Total Sector Imbalance", "BUY Side Sector Imbalance", and/or "SELL Side Sector Imbalance" allow for the minimization and/or bounding of the value of the difference between the residual total, BUY side, or SELL side trades in each of a plurality of sectors, including: Basic Materials, Consumer Cyclical, Consumer Non-Cyclical, Financials, Health, Industrials, Information Technology, Resources, Telecommunication Services, Utilities. Choices are, for example: Ignore, Minimize, Bound at Current, and Minimize & Bound at Current. Selecting Minimize will cause the optimizer to attempt to make the imbalances in the residual tradelist's sectors as close to zero as possible. Selecting Bound at Current will create bounds that prevent the residual tradelist's sector imbalances from being larger than those in the initial tradelist.

At field 443, a user can employ a "Liquidity" objective. "Liquidity", in the context of the present invention, relates to an objective to be achevid by a trader. This objective being implemented using the weighted average of median daily trading volume of the residual trades, and allowing for additional functionality in order to achieve an objective size of residual trades relative to the trading volume. Choices are, for example: Ignore, Lower Bound at Current, Maximize, and Lower Bound & Maximize. Lower Bound forces, if possible, the residual tradelist's weighted average percent of median daily volume is lower or equal to that of the initial tradelist. Selecting Maximize adds to the objective function a term that encourages the residual trades to be as small as possible relative to trading volume.

A user can employ objectives relating to buy side and sell side residual tradelist inputs. The inputs available for controlling the properties of each side of the residual tradelist separately are the same. However, a user can select each objective independently, allowing for complete flexibility and control over the BUY and SELL residual trades. Each input is described once here since it behaves the same way for both of the sides.

At fields 449 and 455, a user can employ an objective relating to the concentrations of both BUY and SELL sides. "BUY Side Concentrations" and "SELL Side Concentrations" allow for additional functionality in order to achieve a residuals trade list which is made up of stocks found in the benchmark. This input pertains to the portion of the residual tradelist comprising stocks that are members of Benchmark. In some situations it is preferable to eliminate (i.e., execute) sooner the trades of stocks not in a particular Benchmark. Choices are: Ignore, Maximize, Lower Bound, and Maximize & Bound. Setting this parameter to Maximize causes the optimizer to maximize the portion of the residual tradelist that is made of stocks in the Benchmark. Setting a Lower Bound prevents, if possible, the residuals from having a lower portion (weight) in Benchmark stocks than the initial tradelist.

Ultimately the goal of executing a tradelist is to move a set of portfolio holdings from an initial (or legacy) state to a target portfolio. Thus, a tradelist exists because a manager desires to move from one set of portfolio holdings to another. A tradelist thus represents current and/or future positions in a portfolio. One way to describe this would be: Portfolio holdings (target)=Portfolio holdings (legacy)+Tradelist.

At any point during the execution of the tradelist, the portfolio's intermediate, transient holdings will be equal to the legacy holdings adjusted for executed trades. Another way of looking at the situation is: Portfolio holdings (intermediate/during trading)=Portfolio holdings (legacy)+Executions.

Because of the direct connection between a tradelist and an underlying portfolio, the execution strategy of the tradelist can have significant impact on the risk and return of the corresponding portfolio. The tradelist optimizer allows the risk of the underlying portfolio holdings to be considered when executing a tradelist.

At field 457, a user can select the underlying portfolio to which the tradelist being optimized belongs.

At field 459, a user can select a benchmark, if applicable, that the portfolio's tracking risk is calculated against. If no benchmark is set, then total, instead of tracking, risk is used. Total risk is typically appropriate for long-short portfolios, and tracking risk for long-only portfolios.

At field 461, a user can select a risk model that can be used to calculate the total or tracking risk of the portfolio.

At field 463, a user can select a risk objective. "Portfolio Holdings Risk" allows for the minimization and/or bounding of the volatility of a portfolio's holdings as measured against a defined benchmark using a defined risk model. Choices are, for example: Ignore, Minimize, Upper Bound, and Minimize & Bound. Selecting Minimize aims to keep the portfolio's risk as low as possible when the wedge trades are executed (and thus applied to the portfolio holdings). Setting an Upper Bound prevents the risk of the portfolio adjusted for wedge trades from going above a specified value.

The following examples are illustrative in nature and are not intended to limit the present invention:

EXAMPLE 1

A portfolio includes a short position of $2000 of IBM, and long positions of $1000 of CSCO and $1000 of GM. A trade list $X_t$ is set up to sell $1000 of GM, sell $1000 of CSCO, and buy $2000 of HPQ. Each component $X_{ti}$ is the signed value of the i stock to be traded. Thus, $X_{t1}$=1000, $X_{t2}$=1000, and $X_{t3}$=−2000 (where unfilled BUYS are negative and unfilled SELLS are positive. Thus, the trade list is "short" its unfilled BUYS and "long" its unfilled SELLS). The covariance matrix R will reflect the fact that the covariance of CSCO and HPQ is high, the covariance of GM and HPQ and GM and CSCO are both low, and the covariance of IBM and HPQ and IBM and CSCO are both high. In other words, CSCO, HPQ and IBM price movements have a positive correlation, while there is little or no correlation between the price movement of GM and any of IBM, CSCO and HPQ. The short position of IBM is represented as −2000. Mathematically, the covariance $R_{23}$ is large, while $R_{12}$ and $R_{13}$ are small.

In order to complete half of the trade list in the current wave, the minimal risk residual portfolio $X_r$ will consist of an outstanding SELL order for $1000 of CSCO and an outstanding BUY order for $1000 of HPQ (since the minimum risk to the trade list given that one-half of the list is to be implemented is to send the SELL order for GM and half of the BUY order for HPQ). Because the covariance IBM, CSCO and HPQ is also high, the holdings risk is quite low since the short position IBM holding is not adversely affected by the residual (open) SELL order for CSCO. However, if the portfolio had a $2000 static long position of IBM, the holdings' risk would be quite high because the holdings portfolio would consist entirely of technology stocks as long positions.

In this manner, this example simultaneously controls the risk of both the residual trade list and the overall holdings in the portfolio, and thus accounts for the interests of the portfolio manager as well as the trader in an environment where the trade manager has no constraints limiting the availability of trades. However, where there is at least one constraint limiting the number of available trades, a different method or system must be used. An embodiment of the current invention is discussed with reference to FIG. 3.

EXAMPLE 2

Suppose that a portfolio worth $1,000,000 can be broken down into $300,000 of Microsoft, $350,000 of IBM, $200,000 of Google, $100,000 of Disney, and $50,000 of GE. For this example, the only constraint entered defines that only "all-or-nothing" trades are available, meaning that if any shares of a particular stock are to be traded all of the shares of that stock contained in the trade list must be traded at the same time. Further, it is the preference of this particular portfolio manger that an executed trade cannot be more than the amount to be desired in a given trade wave.

In this example, the portfolio manager has a trade list consisting of $350,000 of IBM, $100,000 of Disney, and $50,000 of GE. Further, the portfolio manager has input his desire to trade 75% of the trade list in one wave. There are several trades that may be executed that conform to the constraints, however none of these alternatives equal 75% of the trade list or $375,000. Therefore, it is necessary to figure out which of the available alternatives comes closest to achieving the desired trade quantity. The available alternatives include: trading all of the IBM shares; trading all of the Disney shares; trading all of the GE shares, or trading all of both the Disney and GE shares. Of these alternatives trading all of the IBM shares is the closest alternative, and therefore, that is the trade that is executed.

One or more aspects of the present invention may includes a computer-based product, which may be hosted on a storage medium and include executable for performing one or more steps of the invention. Such storage mediums can include, but are not limited to, computer disks including floppy or optical disks or diskettes, CDROMs, magneto-optical disk, ROMs, RAMs, EPROMs, EEPROMs, flash memory, magnetic or optical cards, or any type of media suitable for storing electronic instructions, either locally or remotely.

The invention being thus described, it will be apparent to those skilled in the art that the same may be varied in many ways without departing from the spirit and scope of the invention. Any and all such modifications are intended to be included within the scope of the following claims.

The invention claimed is:

1. A method of managing risk to a portfolio of securities holdings while executing an outstanding trade list, comprising the steps of:

determining, by a computer, covariances between securities in the outstanding trade list and securities in the portfolio of holdings;

receiving, by a computer, at least one objective to be achieved by the trade;

receiving, by a computer, at least one constraint for the execution of a trade;

receiving, by a computer, a percentage of value of said outstanding trade list desired to be executed in the current wave of trading; and determining, by a computer, an immediately executable trade list based at least in part on said covariances, said at least one objective, and said at least one constraint, wherein said executable trade list satisfies said at least one constraint and said proposed quantity.

2. The method as recited in claim 1, further including a step of receiving, by a computer, a request for additional immediately executable trade lists at a user defined interval, said additional immediately executable trade lists being generated and displayed iteratively.

3. The method as recited in claim 1, further including a step of receiving, by a computer, a request for Variable Progress.

4. The method as recited in claim 1, wherein said at least one constraint is chosen from a list comprising:

Round Lot Trades, All-or-Nothing Trades, SELL-BUY, Fill Ratio, Maximum Size in Percent of Median Daily Trading Volume, Start and End Bins, and Ace Cost.

5. The method as recited in claim 1, wherein said at least one objective is chosen from a list comprising:

Total Risk, BUY Tracking Risk Side, SELL Side Tracking Risk, Total Sector Imbalance, BUY Side Sector Imbalance, SELL Side Sector Imbalance, liquidity, BUY Side Concentration, SELL Side Concentrations, Initial Wedge Size, and Portfolio Holdings Risk.

6. The method as recited in claim 1, wherein said at least one objective is Portfolio Risk.

7. A system for managing risk to a portfolio of securities holdings while executing an outstanding trade list, comprising:

means for determining covariances between securities in the outstanding trade list and securities in the portfolio of holdings;

means for receiving at least one objective to be achieved by the trade; means for receiving at least one constraint for the execution of a trade; means for receiving a percentage of value of said outstanding trade list desired to be executed in the current wave of trading; and means for determining an immediately executable trade list based at least in part on said covariances, said at least one objective, and said at lease one constraint, wherein said executable trade list satisfies said at least one constraint and said proposed quantity.

8. The system as recited in claim 7, further including means for receiving a request for additional immediately executable trade lists at a user defined interval, said additional immediately executable trade lists being generated and displayed iteratively.

9. The system as recited in claim 7, further including means for receiving a request for Variable Progress.

10. The system as recited in claim 7, wherein said at least one constraint is chosen from a list comprising: Round Lot Trades, All-or-Nothing Trades, SELL-BUY Imbalance, Fill Ratio, Maximum Size in Percent of Median Daily Trading Volume, Start and End Bins, and Ace Cost.

11. The system as recited in claim 7, wherein said at least one objective is chosen from a list comprising:

Total Risk, BUY Tracking Risk Side, SELL Side Tracking Risk, Total Sector Imbalance, BUY Side Sector Imbalance, SELL Side Sector Imbalance, Liquidity, BUY Side Concentration, SELL Side Concentrations, Initial Wedge Size, and Portfolio Holdings Risk.

12. The system as recited in claim 7, wherein said at least one objective is Portfolio Risk.

\* \* \* \* \*

UNITED STATES PATENT AND TRADEMARK OFFICE
CERTIFICATE OF CORRECTION

PATENT NO. : 8,429,054 B2
APPLICATION NO. : 13/251708
DATED : April 23, 2013
INVENTOR(S) : John Krowas et al.

Page 1 of 1

It is certified that error appears in the above-identified patent and that said Letters Patent is hereby corrected as shown below:

In the Specification

Col. 3      line 36, "$X_{tj}$" should be "$X_{tij}$"

Col. 4      line 1, "$a_{st}$" should be "$\alpha_{st}$"

Col. 4      line 8, "$A_{st}$" shold be "$\lambda_{st}$"

Signed and Sealed this
Twenty-sixth Day of August, 2014

Michelle K. Lee
*Deputy Director of the United States Patent and Trademark Office*